United States Patent
Harris et al.

(10) Patent No.: US 9,304,531 B2
(45) Date of Patent: Apr. 5, 2016

(54) DYNAMICALLY SCALING VOLTAGE/FREQUENCY

(71) Applicant: Broadcom Corporation, Irvine, CA (US)

(72) Inventors: David Money Harris, Upland, CA (US); Kwok Ping Hui, Holland, PA (US)

(73) Assignee: BROADCOM CORPORATION, Irvine, CA (US)

( * ) Notice: Subject to any disclaimer, the term of this patent is extended or adjusted under 35 U.S.C. 154(b) by 280 days.

(21) Appl. No.: 13/686,516

(22) Filed: Nov. 27, 2012

(65) Prior Publication Data

US 2014/0122904 A1     May 1, 2014

Related U.S. Application Data

(60) Provisional application No. 61/720,599, filed on Oct. 31, 2012.

(51) Int. Cl.
    *G06F 1/08*     (2006.01)
    *G06F 1/32*     (2006.01)

(52) U.S. Cl.
    CPC .... *G06F 1/08* (2013.01); *G06F 1/324* (2013.01); *G06F 1/3296* (2013.01); *Y02B 60/1217* (2013.01); *Y02B 60/1285* (2013.01); *Y02B 60/32* (2013.01)

(58) Field of Classification Search
    CPC .............................................. G01R 31/318536
    USPC ................................................. 713/322, 300
    See application file for complete search history.

(56) References Cited

U.S. PATENT DOCUMENTS

| | | | | |
|---|---|---|---|---|
| 5,870,404 A * | 2/1999 | Ferraiolo et al. | | 714/700 |
| 7,116,142 B2 * | 10/2006 | Ferraiolo et al. | | 327/149 |
| 7,278,080 B2 * | 10/2007 | Flautner et al. | | 714/746 |
| 7,913,139 B2 * | 3/2011 | Kurimoto | | 714/731 |
| 8,028,210 B2 * | 9/2011 | Kurimoto | | 714/731 |
| 2004/0199821 A1 * | 10/2004 | Flautner et al. | | 714/30 |
| 2005/0283630 A1 * | 12/2005 | Shikata | | 713/322 |
| 2007/0220385 A1 * | 9/2007 | Ogawa | | 714/726 |
| 2008/0129357 A1 * | 6/2008 | Chlipala et al. | | 327/161 |
| 2008/0307277 A1 * | 12/2008 | Tschanz et al. | | 714/726 |
| 2011/0006827 A1 * | 1/2011 | Shimura | | 327/306 |
| 2011/0133786 A1 * | 6/2011 | Yamaoka et al. | | 327/97 |

(Continued)

OTHER PUBLICATIONS

Agarwal, et al, Circuit Failure Prediction and Its Application to Transistor Aging, 25$^{th}$ IEEE VLSI Test Symmposium, 2007.*

(Continued)

*Primary Examiner* — Jaweed A Abbaszadeh
*Assistant Examiner* — Cheri Harrington
(74) *Attorney, Agent, or Firm* — Oblon, McClelland, Maier & Neustadt, L.L.P.

(57) ABSTRACT

Disclosed are various embodiments providing processing circuitry that generates an output for each clock cycle of a clock signal using a logic block, the logic block being powered by a supply voltage. The processing circuitry detects whether the output has stabilized at a point in time before the end of a clock cycle of the clock signal, the point in time being based at least upon a delay line. In response to detecting whether the output has stabilized at a point in time, the processing circuitry dynamically adjusts at least one of the supply voltage or the frequency of the clock signal.

12 Claims, 10 Drawing Sheets

(56) References Cited

U.S. PATENT DOCUMENTS

2011/0267096 A1* 11/2011 Chlipala et al. .............. 326/16
2011/0302460 A1* 12/2011 Idgunji et al. .............. 714/55

OTHER PUBLICATIONS

University of California Berkley, EE 42 Introduction to Digital Electronics, "Lecture 31", Fall 2004, p. 11 (https://inst.eecs.berkeley.edu/~ee42/fa04/).*

K. Bowman et al., "Energy-efficient and metastability-immune resilient circuits for dynamic variation tolerance," IEEE. J. Solid-State Circuits, vol. 44, No. 1, Jan. 2009, pp. 49-63.

S. Das et al., "RazorII: in situ error detection and correction for PVT and SER tolerance," IEEE. J. Solid-State Circuits, vol. 44, No. 1, Jan. 2009, pp. 32-48.

D. Ernst et al., "Razor: a low-power pipeline based on circuit-level timing speculation," Proc. Intl. Symp. Microarchitecture, Dec. 2003, pp. 7-18.

M. Fojtik, D. Fick, Y. Kim, N. Pinckney, D. Harris, D. Blaauw, and D. Sylvester, "Bubble Razor: An architecture-independent approach to timing-error detection and correction," Proc. Intl. Solid-State Circuits Conf., Feb. 2012, pp. 28.6.

C. Lefurgy, A. Drake, M. Floyd, M. Allen-Ware, B. Brock, J. Tierno, and J. Carter, "Active management of timing guardband to save energy in POWER7," Proc. Micro 44, Dec. 2011.

N. Weste and D. Harris, CMOS VLSI Design, 4th Ed., Boston: Addison Wesley, 2011.

* cited by examiner

DYNAMICALLY SCALING VOLTAGE/FREQUENCY

CROSS-REFERENCE TO RELATED APPLICATIONS

This application is a utility application that claims priority to U.S. Provisional Patent Application titled, "Dynamically Scaling Voltage/Frequency", having Ser. No. 61/720,599, filed Oct. 31, 2012, which is entirely incorporated herein by reference.

BACKGROUND

Processing circuitry may employ an open-loop circuit design where a power supply voltage and a clock frequency are fixed to static values. Such supply voltage and clock frequency schemes may be set to worst-case conditions rather than actual conditions. This may require a margin for global and local process variation, such as, for example, temperature drift, high and low-frequency voltage variation, aging, clock skew, modeling inaccuracy, or other variations. However, it may be the case that the processing circuitry may be capable of operating at substantially higher frequency or higher voltage.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to systems and methods for dynamically for adjusting voltage and/or frequency of processing circuitry. The processing circuitry may comprise a processor or any logic circuitry that is organized as various combinational logic blocks. Each block of combinational logic may be synchronized to a clock signal to form a synchronous sequential circuit. In this respect, each combinational logic block may comprise a stage in a pipeline architecture to handle data flowing through the pipeline in a synchronous manner.

The present disclosure is directed to sampling the output of each logic block a first time and a second time for a particular clock cycle. The first sample time is slightly earlier than the second sample time, where the second sample time is at the end of the particular clock cycle. If the two samples differ, a warning signal is generated. The warning signal indicates that the logic block output is changing close to the end of the clock cycle. In response to the warning signal, a dynamic voltage/frequency controller may adjust the supply voltage or clock frequency. In various embodiments, the two samples are performed by a register containing a flip-flop and a detection latch. The detection latch performs the early sampling. According to a clock delay implementation, the clock arrives earlier at the latch. In a data delay implementation, the data to the latch is delayed.

Specifically, a register may be used at the output of each logic block, where the register is configured to sample the output early before the end of a clock cycle. Based on the sampled output, it may be determined that the sampled output is approaching the minimum clock period achievable under the current operating conditions of the processing circuitry. The warning signal is generated in response to the sampled output approaching the minimum clock period. In response to the warning signal, a dynamic voltage/frequency controller may adjust the clock frequency and/or supply voltage to a clock domain to minimize power or maximize performance while ensuring reliable operation.

Moreover, a delay may be inserted into data paths in the register to control when the output is sampled. The delay may be set based on considering delay variation caused by high-frequency power supply variations and/or clock jitter, which may be significantly less than the total delay variation of the processing circuitry.

Figure 1:
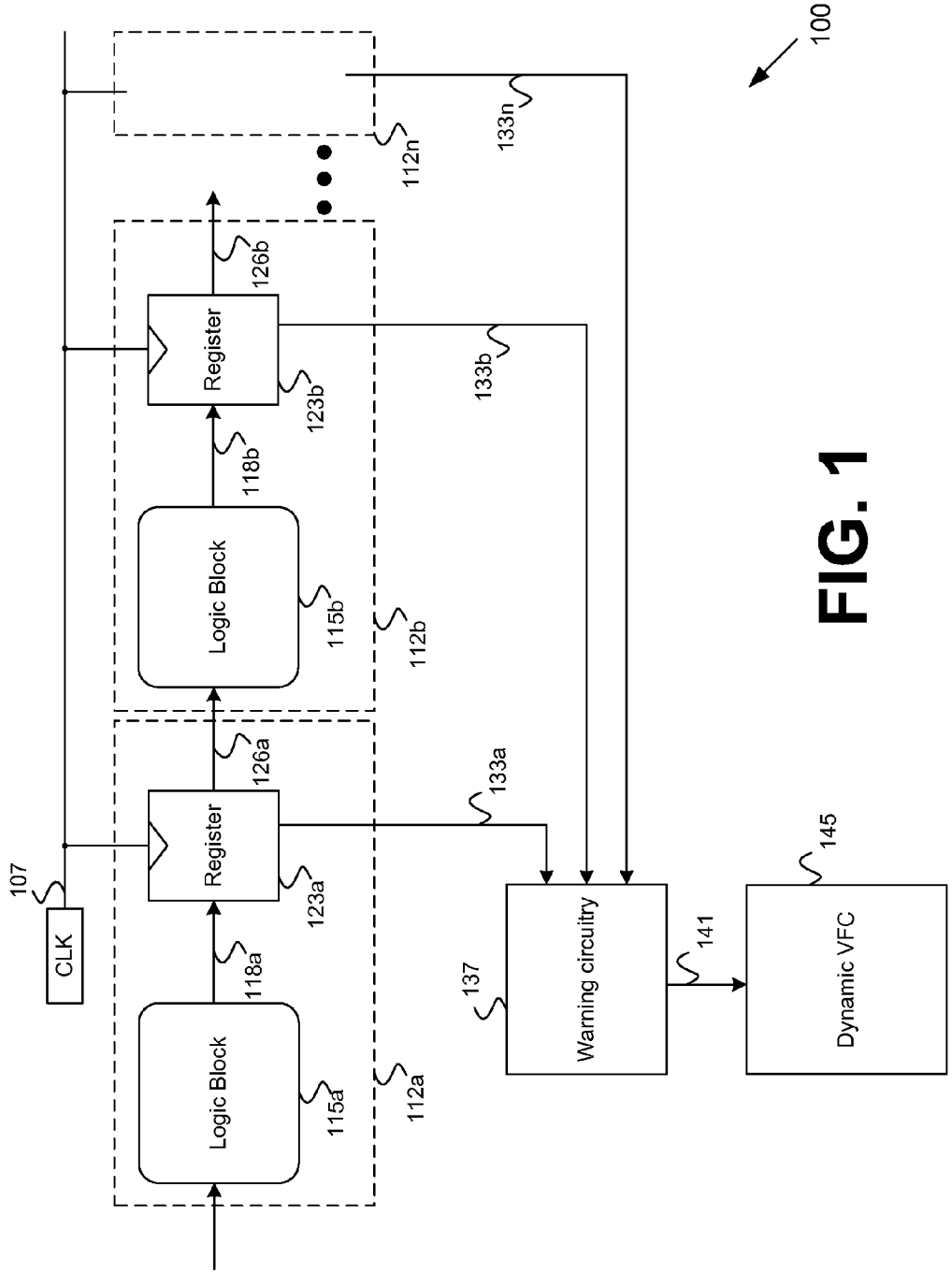
FIG. 1 is a drawing of an example of processing circuitry, in accordance with various embodiments of the present disclosure.

Reference is made to FIG. 1 which illustrates an example of processing circuitry 100, in accordance with various embodiments of the present disclosure. The processing circuitry 100 may be implemented using one or more circuits, one or more processors, application specific integrated circuits, dedicated hardware, digital signal processors, microcomputers, central processing units, field programmable gate arrays, programmable logic devices, state machines, or any combination thereof. In yet other embodiments, the processing circuitry 100 may include one or more software modules executable within one or more processing circuits. The processing circuitry 100 may further include memory configured to store instructions and/or code that causes the processing circuitry 100 to execute data processing functions.

The processing circuitry 100 is powered by one or more power supply voltages. Furthermore, the processing circuitry 100 may execute various synchronous operations such that portions or blocks of the processing circuitry 100 process data according to a clock signal 107 generated by a clock. The clock signal 107 is characterized by a clock frequency. The power supply voltage and clock frequency may be adjusted to boost performance or save power in the processing circuitry 100. However, such an adjustment may lead to a malfunctioning by the processing circuitry 100. Accordingly, various embodiments are directed to identifying optimal operating conditions of the processing circuitry 100 while reducing the risk of causing malfunction.

The processing circuitry 100 comprises a chain of processing stages 112*a-n*. Each processing stage 112 may correlate to a pipeline stage, where the pipeline stages implement a pipeline architecture in the processing circuitry 100. Each processing stage 112 is configured to perform various data operations. A processing stage 112 comprises a logic block 115. A logic block 115 comprises combinational logic configured to perform a specific operation. Each logic block 115 generates an output 118. The output 118 is transmitted to a register 123 for writing the data expressed in the output according to a clock signal 107. The register 123 may comprise one or more latches, one or more flip flops, one or more dynamic gates, or any other digital circuit element that facilitates the storing of data.

The register 123 of a processing stage 112 is configured to store or otherwise write the output 118 and transmit a written output 126*a* to a subsequent processing stage 112 or other portion of the processing circuitry. To effectuate synchronous processing, the register 123 may sample the output 118 on a per clock cycle basis to generate a written output 126. The written output 126 is provided to a subsequent processing stage 112 as an input on the per clock cycle basis. In addition, the register 123 may generate a warning signal 133. The warning signal 133 may be generated based on a determination that a timing of the output 118 is approaching a minimum clock period, as is discussed in further detail below.

The processing circuitry 100 comprises warning circuitry 137 that analyzes the warning signals 133. The warning circuitry 137 may comprise one or more logic elements for detecting and/or stabilizing warning signals. The warning circuitry 137 may generate a domain warning signal 141. The domain warning signal 141 may be sent to a dynamic voltage frequency controller (DVFC) 145. The warning signal 133 may indicate to the DVFC to adjust the supply voltage and/or clock frequency.

The DVFC 145 controls and adjusts the voltage of the power supply to portions of the processing circuitry 100 and/or the frequency of the clock signal 107. In a high-performance mode, the processing circuitry 100 operates at a maximum voltage and frequency. In response to a reduced workload, the voltage and/or frequency may be reduced to save power. In various embodiments, the processing circuitry 100 is partitioned into one or more Voltage-Frequency Domains (VFDs) and one or more DVFC controllers 145 for selecting appropriate voltages and/or frequencies for each VDF, given the workload.

Next, a general description of the operation of the various components of the processing circuitry 100 is provided. The processing of the data may be performed using a set of processing stages 112. For example, a logic block 115*a* of a first processing stage 112*a* processes the data and generates an output 118*a*. The register 123*a* of the first processing stage 112*a* receives the output 118*a*. The register 123*a* is configured to write the output 118*a* according to a clock cycle of a clock signal 107. That is to say, the register 123*a* samples the output 118*a* and provides the sampled output as a written output 126*a* to a subsequent processing stage 123*b*. The register 123*a* obtains a clock signal 107 for sampling the output 118*a* on a per clock cycle basis. The clock signal 107 is characterized by a plurality of sequential clock cycles such that each register 123 writes an output 118 for each clock cycle.

The output 118 is written for each active edge of a clock cycle. An active edge may comprise a rising edge and/or a falling edge of a clock cycle. Put another way, data is written at the end of a clock cycle. Thus, the register 123*a* of the first processing stage 112*a* writes the output 118*a* for generating a written output 126*a* that is available to the next processing stage 112*b* at the subsequent clock cycle. At the subsequent clock cycle, a logic block 115*b* of the next processing stage 112*b* processes the written output 126*a* for generating the next output 118*b*.

In various embodiments of the present disclosure, the register 123 comprises at least two sampling elements. The first sampling element samples the output 118 at the end of the clock cycle to produce the written output 126. The second sampling element effectively samples the output 118 some delay before the end of the clock cycle. In a clock delay implementation, the second sampling element uses an earlier version of the clock to sample earlier. In data delay, the second sampling element uses the same clock as the first sampling element, but delays the output 118 to the second sampling element. This effectively causes the second sampling element to sample a time-shifted version of the output 118. Thus, the sampled output of the second sampling element may be sampled according to a predetermined delay of time.

If the output 118 arrives too close to the end of the clock cycle, it will be correctly sampled by the first sampling element but will be missed by the second sampling element. The sampled output may be compared to the written output 126 to determine a discrepancy or mismatch. Accordingly, a warning signal 133 may be generated for the output 118 in the presence of a discrepancy or mismatch. The warning signal 133 indicates that the logic block 115 that generated the output 118 is pushing a maximum operating condition in terms of voltage and/or clock frequency.

Warning circuitry 137 implemented in the processing circuitry 100 is configured to receive various warning signals 133 from various registers 123. The warning circuitry 137 may be configured to detect received warning signals 133 as well as stabilize each received warning signal 133. If a warning signal 133 is detected by the warning circuitry 137, the warning circuitry 137 may generate a domain warning signal 141 for instructing a DVFC 145 to adjust the voltage and/or frequency. By adjusting the voltage and/or frequency, the processing circuitry 100 may provide more headroom in terms of operation.

Figure 2A:
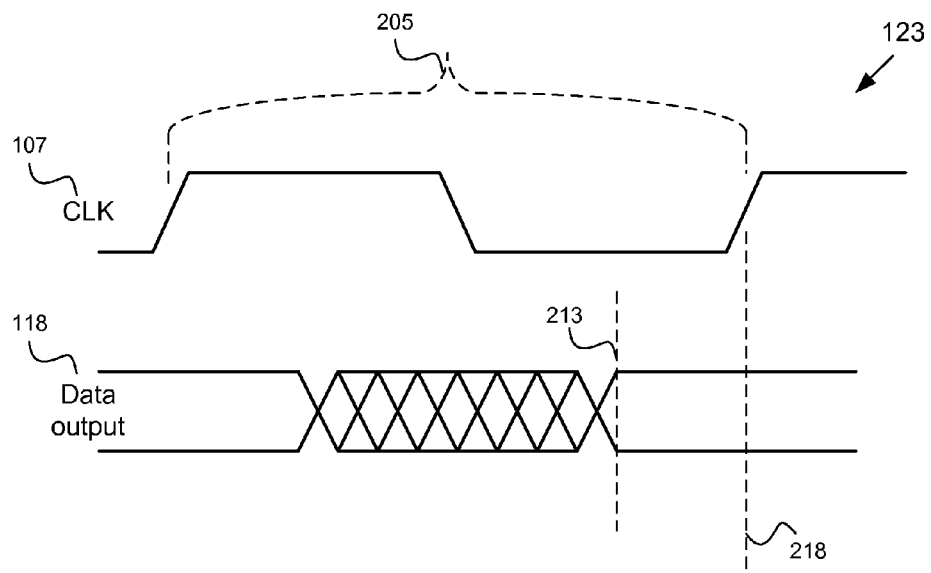
FIGS. 2A and 2B are examples of timing diagrams of data in a register implemented in the processing circuitry of FIG. 1, in accordance with various embodiments.

Moving on to FIG. 2A, shown is an example of a timing diagram of data in a register 123 implemented in the processing circuitry 100 of FIG. 1, in accordance with various embodiments. The non-limiting example of FIG. 2A demonstrates an operation of the processing circuitry 100, where there is sufficient headroom for a logic block 115 (FIG. 1) to operate. Sufficient headroom, for example, may refer to an adequate clock period for which the logic block 115 has sufficient time to generate a stabilized output 118 (FIG. 1).

A register 123 receives a clock signal 107. The clock signal 107 may be characterized by a particular clock period 205. If the clock period 205 is long, then a logic block 115 may have sufficient time to generate a stabilized output 118. However a long clock period may lead to a slow rate of processing data in the processing circuitry 100.

The register 123 is configured to receive an output 118 from a logic block 115. The output may begin changing at an initial point. The logic block 115 completes processing the data and the output 118 stabilizes at a stopping point 213. The time it takes for the logic block 115 to process the data is referred to as a propagation delay. The propagation delay is the amount of time from the rising edge of the clock 107 to the stopping point 213. For proper operation, the propagation delay must be shorter than the clock period 205 so that the output 118 arrives in time to be written on the next rising edge.

The register 123 is configured to write the output 118 at some time at or immediately before the end of the current clock cycle 218. Thus, as seen in the non-limiting example FIG. 2A, the intended data expressed in the output 118 is to be correctly written by the register 123. Accordingly, the register 123 may transmit the written output 126 (FIG. 1) to the next processing stage 112 (FIG. 1).

Figure 2B:
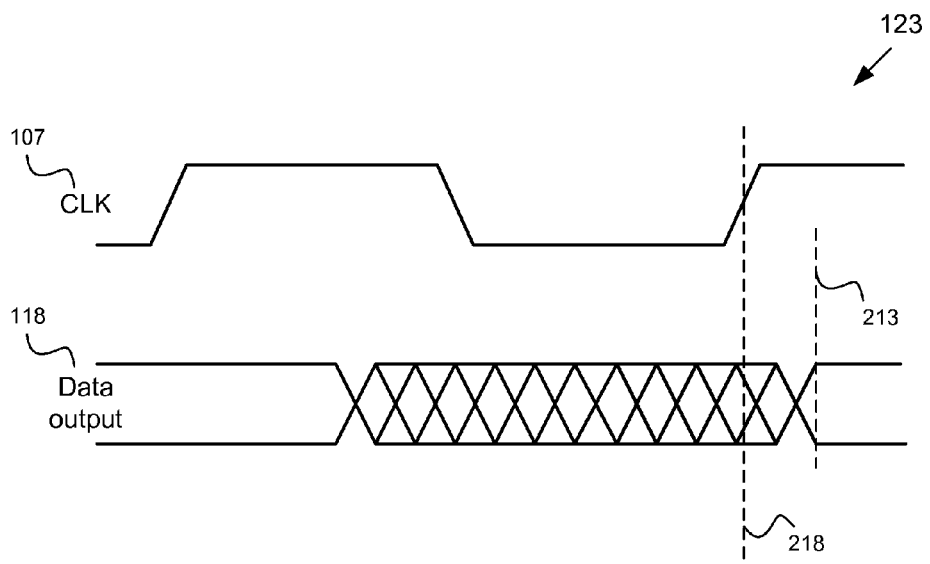

Moving on to FIG. 2B, shown is an example of a timing diagram of data in a register 123 implemented in the processing circuitry 100 of FIG. 1, in accordance with various embodiments. The non-limiting example of FIG. 2B demonstrates an operation of the processing circuitry 100 where there is not sufficient headroom for a logic block 115 (FIG. 1) to operate. This may result from a clock period length being too short. This may also result from the data processing by a logic block 115 being too slow.

A register 123 receives a clock signal 107. The register 123 is configured to receive an output 118 from a logic block 115. The logic block 115 may begin processing data at an initial point. The logic block 115 completes processing the data at a stopping point 213. As seen in the non-limiting example of FIG. 2B, the data settles to its intended value at the stopping point 213, which is beyond the end of the current clock cycle 218.

The register 123 of FIG. 2B misses writing the data expressed in the output 118. This results in a malfunction by the processing circuitry 100. The problem depicted in FIG. 2B may be alleviated if the clock period is increased and/or the voltage is increased. Such adjustments allow the logic block 115 that is responsible for generating the output 118 to have sufficient time in generating a stabilized output 118.

Figure 3:
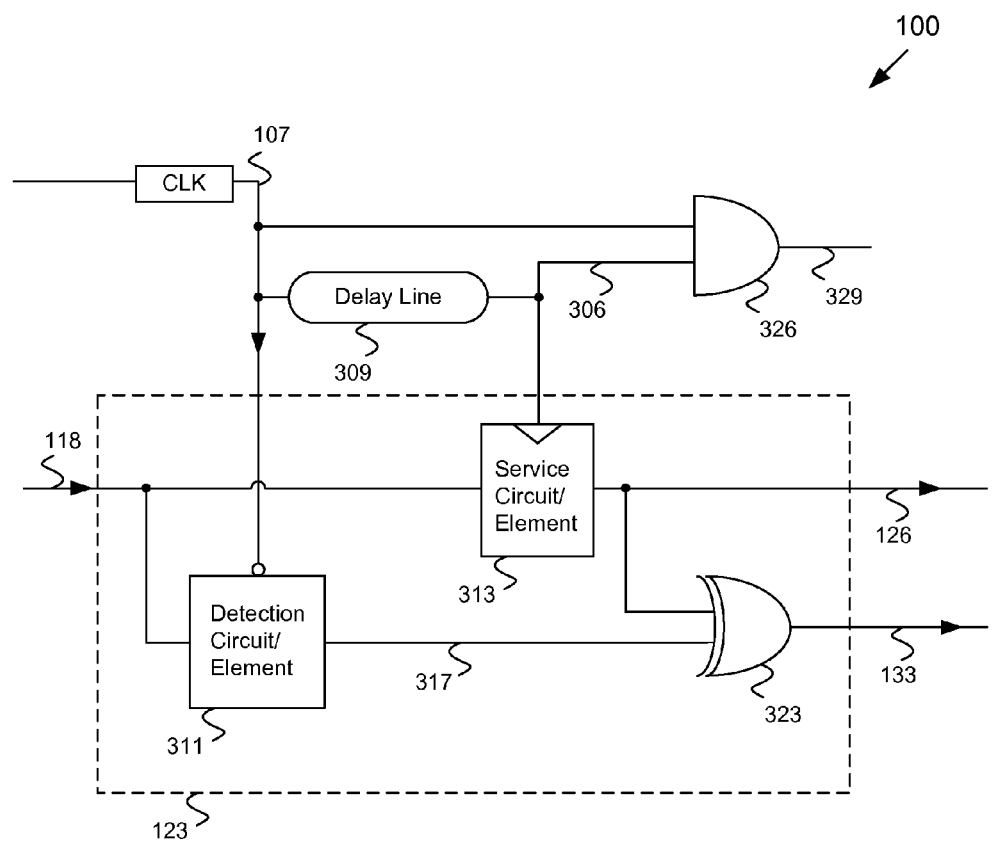
FIG. 3 is a diagram of an example of a register implemented in the processing circuitry of FIG. 1 using a clock delay implementation, in accordance with various embodiments.

Turning to FIG. 3, shown is an example of a register 123 implemented in the processing circuitry 100 of FIG. 1, in accordance with various embodiments. The non-limiting example of FIG. 3 depicts a register 123 that uses a clock delay to detect whether data expressed in an output 118 is stable before the end of a clock cycle.

In the non-limiting example of FIG. 3 the delayed global clock signal 306 may be generated based on a global clock signal 107. In various embodiments, a delay line 309 is used to generate the delayed global clock signal 306. By placing a delay line 309 in the path of the global clock signal 107, the delayed global clock signal 306 is generated. Furthermore, the delayed global clock signal 306 may be supplied to each of the registers 123 of the processing circuitry 100. In this respect, a pipeline architecture implemented by the processing circuitry 100 is synchronized according to a delayed global clock signal 306. In various embodiments, the delay line 309 is shared across multiple registers 123 of the processing circuitry 100.

The register 123 comprises a detection element 311 and a service element 313. The detection element 311 may comprise one or more digital circuits such as, but not limited to, a latch, or a flip-flop. The service element 313 may comprise one or more digital circuits, such as, but not limited to, a latch or a flip-flop.

According to various embodiments, the detection element 311 is configured to sample the data expressed in an output 118 corresponding to a point in time that is earlier than that of the input to the service element 313. In this respect, the detection element 311 receives the global clock signal 107 while the service element 313 receives the delayed global clock signal 306. The detection element 311 may comprise an inverter configured to synchronize according to the complement of the global clock signal 107.

The data expressed in the output 118 is received by both the detection element 311 and the service element 313. The detection element 311 generates a sampled output 317 according to the global clock signal 306. The detection element 311 samples the output 118 earlier than does the service element 313. Thus, if the output 118 arrives during the detection window between the sampling times of the detection element 311 and the service element 313, the detection output 317 will differ from the service element output. The service element 313 is configured to generate the written output 126 according to the delayed global clock signal 306. To this end, the service element 313 writes the data expressed in the output 118 from the logic block 115 (FIG. 1) that is responsible for generating the output 118.

The detection output 317 and the written output 126 are compared to each other to determine whether there is a mismatch. The register 123 may comprise a comparator 323 for detecting a mismatch or disagreement. The comparator 323 may comprise one or more logic gates such as, for example, an XOR gate. The output of the comparator 323 is a warning signal 133 indicating whether a mismatch between the detection output 317 and the written output 126 exists, thereby indicating that the logic block output 118 is arriving relatively close to the end of the clock cycle.

According to various embodiments, the service element 313 comprises a flip-flop that samples on the rising edge of the delayed global clock 306. The detection element 311 may comprise a latch that is transparent during the low or inactive portion of the global clock 107. Hence, the register 123 produces a warning signal 133 when the logic block output 118 changes during a detection window before the rising edge of the delayed global clock 306. The width of the detection window is defined by the delay line 309.

With regard to the clock delay implementation depicted in the non-limiting example of FIG. 3, the global clock signal 107 and the delayed global clock signal 306 may be combined together using a combiner 326. The combiner 326 may comprise one or more logic gates to facilitate an AND operation. To this end, the output of the combiner 326 is a combined clock signal 329. The combined clock signal 329 may be used by warning circuitry 137 as discussed in further detail below with respect to FIG. 7.

Figure 4A:
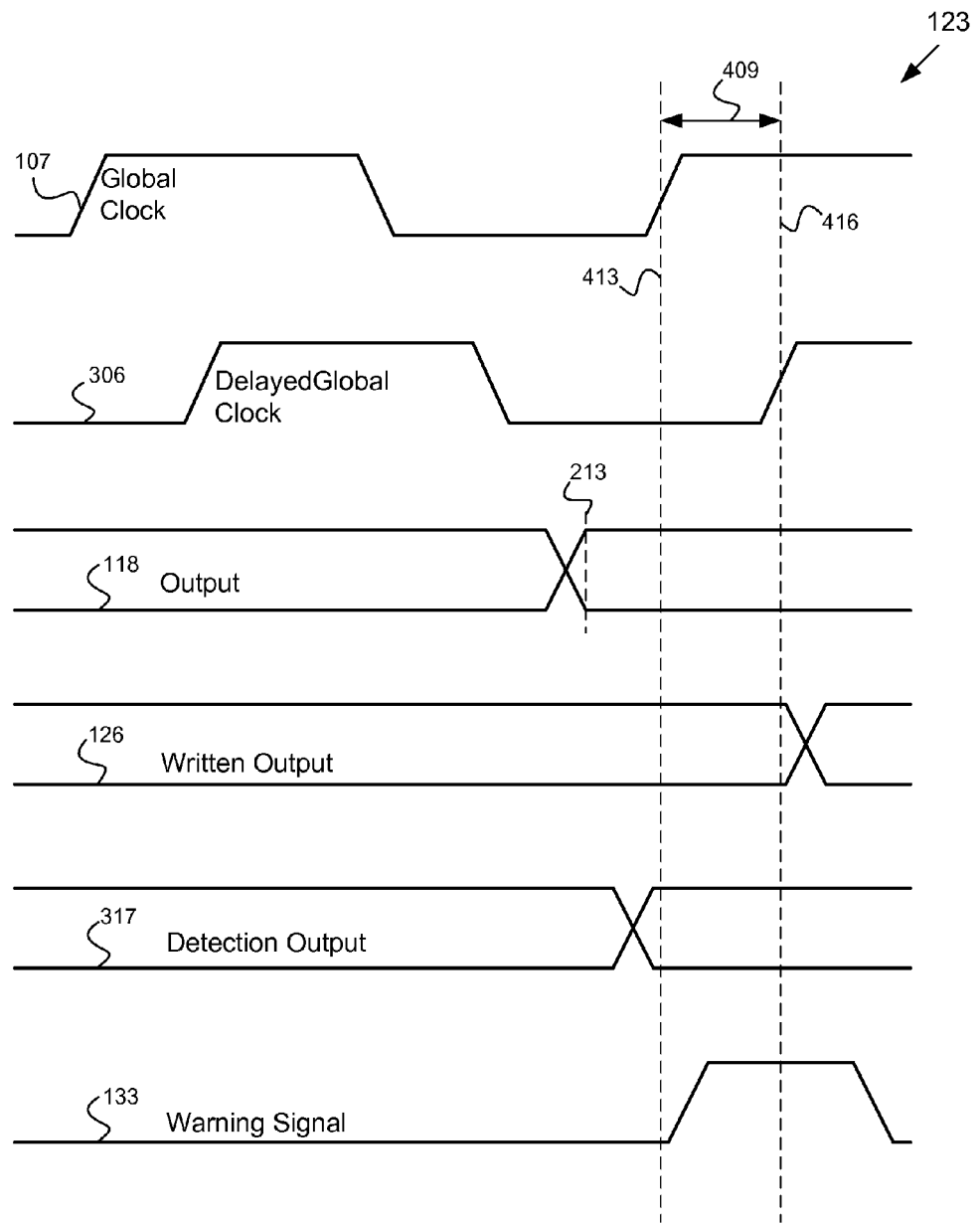
FIGS. 4A and 4B are examples of timing diagrams of data in the register of FIG. 3 implemented in the processing circuitry of FIG. 1, in accordance with various embodiments.

Referring next to FIG. 4A, shown is an example of timing diagrams of data in the register 123 of FIG. 3 implemented in the processing circuitry 100 of FIG. 1 using the clock delay implementation, in accordance with various embodiments. The non-limiting example of FIG. 4A demonstrates an operation of a register 123 using the clock delay implementation of FIG. 3. Furthermore, FIG. 4A depicts an example of sampling data expressed in output 118 where there is sufficient headroom for a logic block 115 (FIG. 1) to operate.

The register 123 of FIG. 3 receives a global clock signal 306 and the delayed global clock signal 306. The delayed global clock signal 306 may be offset according to a delay with respect to the global clock signal 107. This offset, for example, may be caused by a delay line 309 (FIG. 3). By using two clock signals separated by a delay, a detection window 409 is generated for detecting whether the data in the output 118 has stabilized before the end of a clock cycle. The detection window 409 may be measured based on the end of the cycle 413 of the global clock signal 107 and the end of the cycle 416 of the delayed global clock signal 306.

The data expressed in the output 118 may stabilize at a stopping point 213. The stopping point 213 in the non-limiting example FIG. 4A precedes the detection window 409. This indicates that the output 118 is to be correctly written by the register 123. This may be seen with respect to the written output 126, which is written according to the end of the cycle 416 of delayed global clock signal 306.

A detection output 317 represents a sampling of the data expressed by the output 118 according to the global clock signal 306. A warning signal 133 is generated based on comparing the detection output 317 and the written output 126. For example, the detection output 317 and the written output 126 may be XOR'ed to determine whether there is a mismatch. As seen in the non-limiting example of FIG. 4A, the warning signal 133 briefly glitches to an active value but then settles correctly to an inactive value.

The warning signal 133 in this non-limiting example indicates that the logic block 115 that generates output 118 has sufficient headroom. Furthermore, FIG. 4A illustrates that the warning signal 133 briefly glitches during the detection window. However, the warning signal 133 ultimately settles to the correct value. The glitching of the warning signal 133 may be alleviated by the warning circuitry 137 (FIG. 1) is as discussed in further detail below.

Figure 4B:
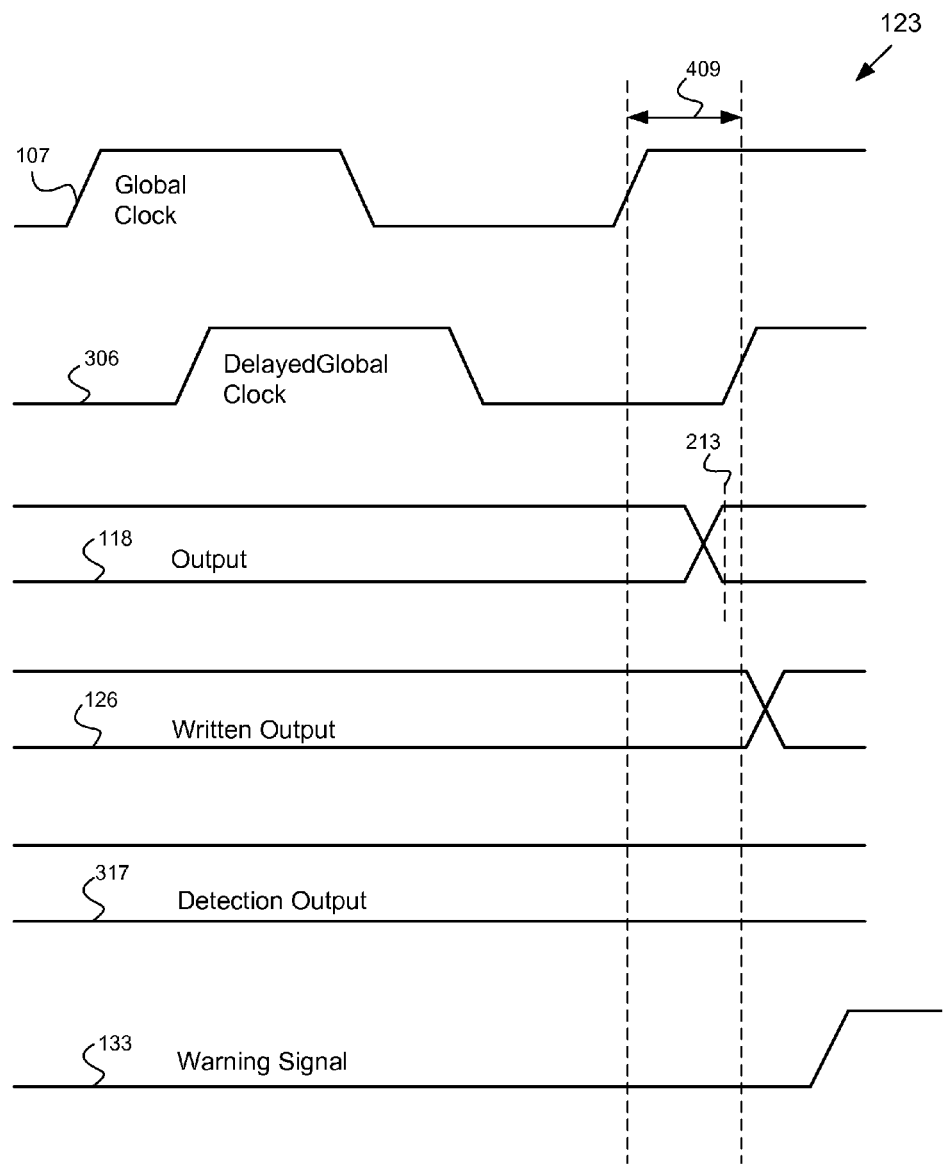

Moving next to FIG. 4B, shown is an example of timing diagrams of data in the register 123 of FIG. 3 implemented in the processing circuitry 100 of FIG. 1, in accordance with various embodiments. The non-limiting example of FIG. 4B demonstrates an operation of a register 123 using the clock delay implementation of FIG. 3. Furthermore, FIG. 4B depicts an example of sampling data expressed in output 118 where there is marginal headroom for a logic block 115 (FIG. 1) to operate. This condition might arise in a case where a supply voltage is too low, the clock period is too short, or the logic block 115 is operating too slowly.

The register 123 of FIG. 3 detects whether data expressed in an output 118 is within a detection window 409. A detection window 409 is generated for detecting whether the data in the output 118 stabilizes too close to the end of a clock cycle.

The data expressed in the output 118 may stabilize at a stopping point 213. The stopping point 213 in the non-limiting example FIG. 4B is within the detection window 409. The stabilized output 118 arrives close to the active clock edge of the delayed global clock signal 306. This warrants warning the processing circuitry 100 (FIG. 1) that the voltage and/or frequency settings should be relaxed.

A detection output 317 represents a sampling of the data expressed by the output 118 according to the global clock signal 107. However, as seen in the non-limiting example of FIG. 4B, the detection element 311 (FIG. 3), which samples data according to the global clock signal 107, misses sampling the data of the output 118. As a result, the detection output mismatches the written output 126. Accordingly, a warning signal 133 is produced that indicates the mismatch. That is to say, the warning signal 133 switches to an active value upon detection of the mismatch.

Figure 5:
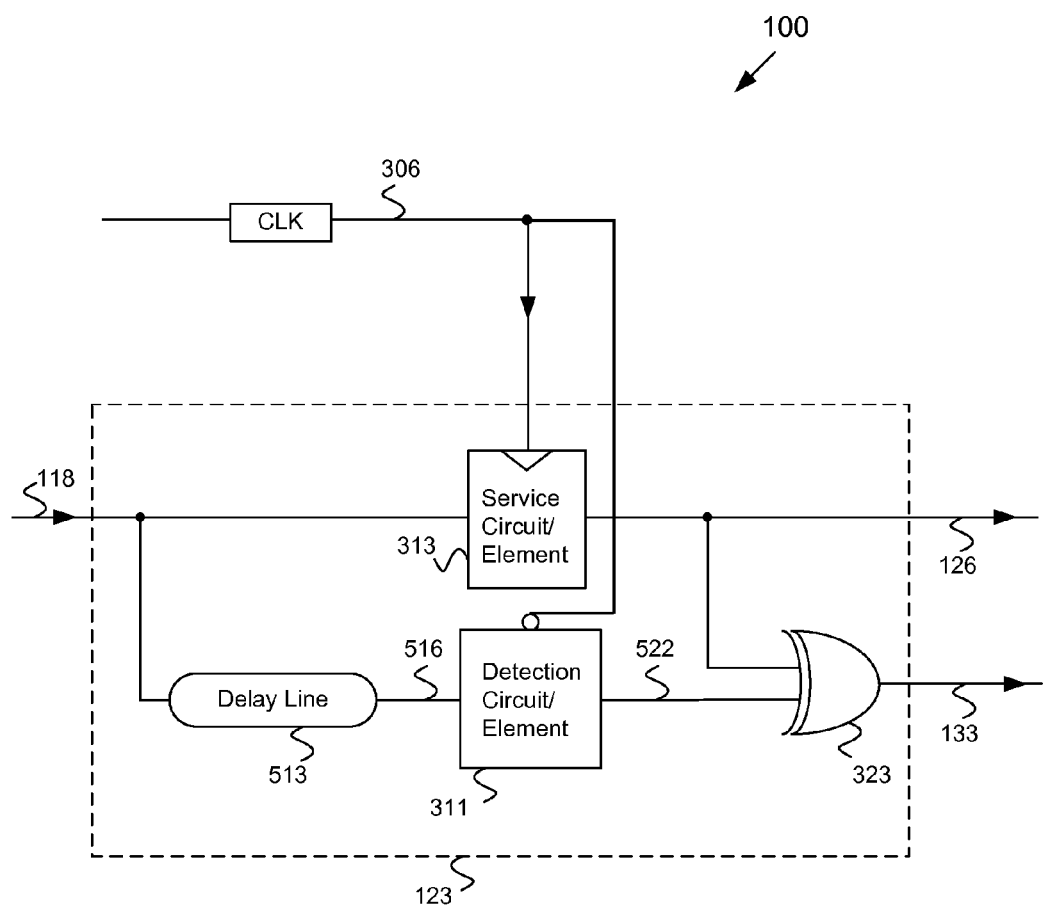
FIG. 5 is a diagram of an example of a register implemented in the processing circuitry of FIG. 1 using a data delay implementation, in accordance with various embodiments.

Turning to FIG. 5, shown is an example of a register 123 implemented in the processing circuitry 100 of FIG. 1 using a data delay implementation, in accordance with various embodiments. The non-limiting example of FIG. 5 depicts a register 123 that uses a data delay rather than a clock delay to detect whether data expressed in an output 118 is stable before the end of a clock cycle. Thus, according to the data delay implementation, the detection window may be produced by delaying data rather than delaying the clock.

In the non-limiting example of FIG. 5 the clock signal 107 is provided to a register 123 that implements a data delay to sample data according to a delay to warn the processing circuitry 100 that the data has settled near the end of a current clock cycle of the clock signal 107. The register 123 of FIG. 5 uses a delay line 513 to delay the data of a logic block output 118. The output of the delay line 513 is a delayed output 516. The delayed output 516 is supplied to a detection element 311. The detection element 311 samples the data expressed in the delayed output 516 according to a detection window defined by the delay line 513. The detection element 311 may comprise an inverter for synchronizing to the compliment of the clock signal 107. This effectively allows the output 118 to be sampled at a predetermined point of time before the end of the clock cycle. The detection element 311 generates a detection output 522 based on the delayed output 516.

The output 118, which has not been delayed, is supplied to a service element 313. The service element 313 is synchronized to the clock signal 107. The service element 313 writes the data of the output 118 for generating a written output 126.

The detection output 522 and the written output 126 are compared to each other to determine whether there is a mismatch. The register 123 may comprise a comparator 323 for detecting a mismatch or disagreement. The comparator 323 may comprise one or more logic gates such as, for example, an XOR gate. The output of the comparator 323 is a warning signal 133 indicating whether a mismatch between the detection output 522 and the written output 126 exists.

A warning signal 133 is generated based on comparing the detection output 522 and the written output 126. For example, the detection output 522 and the written output 126 may be XOR'ed to determine whether there is a mismatch.

Figure 6A:
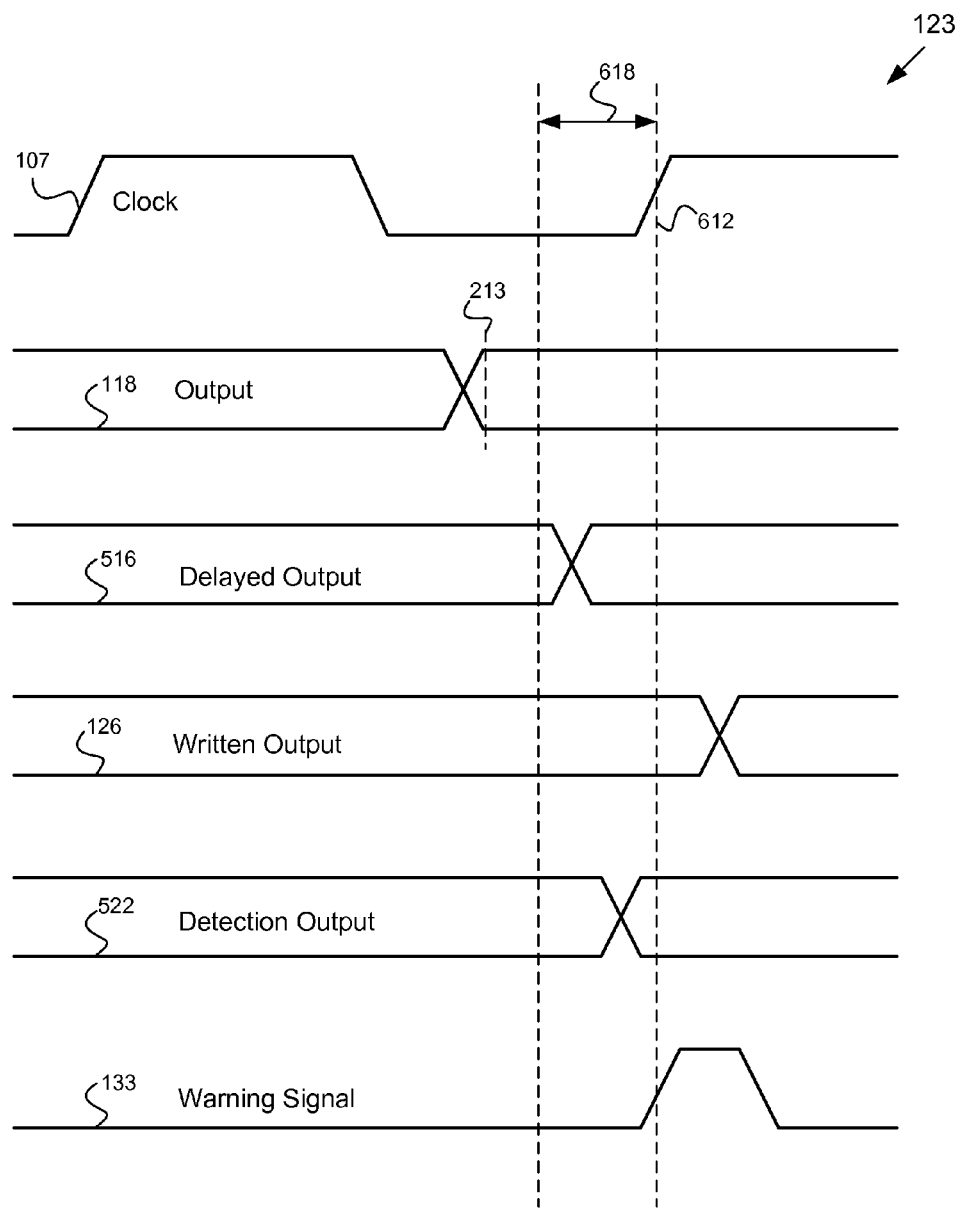
FIGS. 6A and 6B are examples of timing diagrams of data in the register of FIG. 5 implemented in the processing circuitry of FIG. 1, in accordance with various embodiments.

Referring next to FIG. 6A, shown is an example of timing diagrams of data in the register 123 of FIG. 5 implemented in the processing circuitry 100 of FIG. 1 using the data delay implementation, in accordance with various embodiments. Furthermore, FIG. 6A depicts an example of sampling data expressed in output 118 where there is sufficient headroom for a logic block 115 (FIG. 1) to operate.

The register 123 of FIG. 5 receives a clock signal 107. The register 123 also receives an output 118 and generates a delayed output 516 by delaying the output 118 according to a delay line 513 (FIG. 5). The output 118 is written by the register 123 to generate a written output 126 according to the end of the current clock cycle 612. This delay between the output 118 and the delayed output 516 effectively creates a detection window 409.

The data expressed in the output 118 may stabilize at a stopping point 213. The stopping point 213 in the non-limiting example FIG. 6A precedes the detection window 409. This indicates that the output 118 is to be correctly written by the register 123. This may be seen with respect to the written output 126, which is written according to the average edge 416 of the clock signal 107.

The delayed output 516 is sampled by the detection element 311 (FIG. 5) to generate a detection output 522. The detection output 522 represents a sampling of the data expressed in the output 118 that has been delayed. A warning signal 133 is generated based on comparing the detection output 522 and the written output 126. For example, the detection output 522 and the written output 126 may be XOR'ed to determine whether there is a mismatch. As seen in the non-limiting example of FIG. 6A, the warning signal 133 briefly glitches to an active value but then settles correctly to an inactive value.

The warning signal 133 in this non-limiting example indicates that the logic block 115 that generates an output 118 has sufficient headroom. Furthermore, FIG. 6A illustrates that the warning signal 133 briefly glitches during the detection window. However, the warning signal 133 ultimately settles to the correct value. The glitching of the warning signal 133 may be alleviated by the warning circuitry 137 (FIG. 1) is as discussed in further detail below.

Figure 6B:
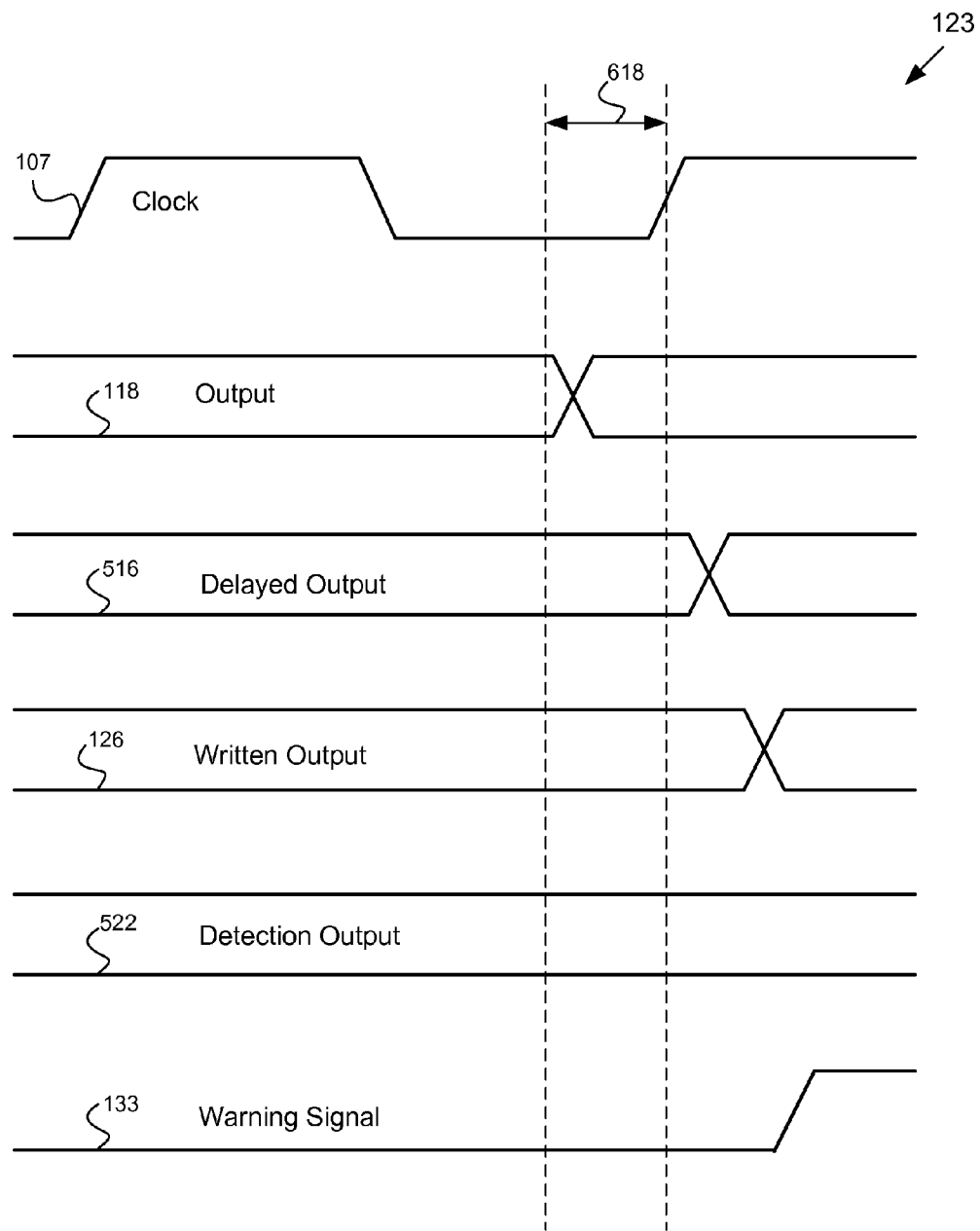

Moving next to FIG. 6B, shown is an example of timing diagrams of data in the register 123 of FIG. 5 implemented in the processing circuitry 100 of FIG. 1 using the data delay implementation, in accordance with various embodiments. Furthermore, FIG. 6B depicts an example of sampling data expressed in output 118 where there is marginal headroom for a logic block 115 (FIG. 1) to operate. This condition might arise in a case where a supply voltage is too low, the clock period is too short, or the logic block 115 is operating too slowly.

The register 123 of FIG. 5 detects whether data expressed in an output 118 is within a detection window 618. The output 118 may stabilize at a stopping point. The stopping point in the non-limiting example FIG. 6B is within the detection window 618. Although the service element 313 (FIG. 5) samples the logic block output 118 correctly, this warrants warning the processing circuitry 100 (FIG. 1) that the voltage and/or frequency settings should be relaxed.

A delayed output 516 is sampled by a detection element 311 (FIG. 5) to generate a detection output 522. However, as seen in the non-limiting example of FIG. 6B, the detection element 311 misses sampling the data of the output 118. As a result, the detection output 522 mismatches the written output 126. Accordingly, a warning signal 133 is produced that indicates the mismatch. That is to say, the warning signal 133 switches to an active value upon detection of the mismatch.

Figure 7:
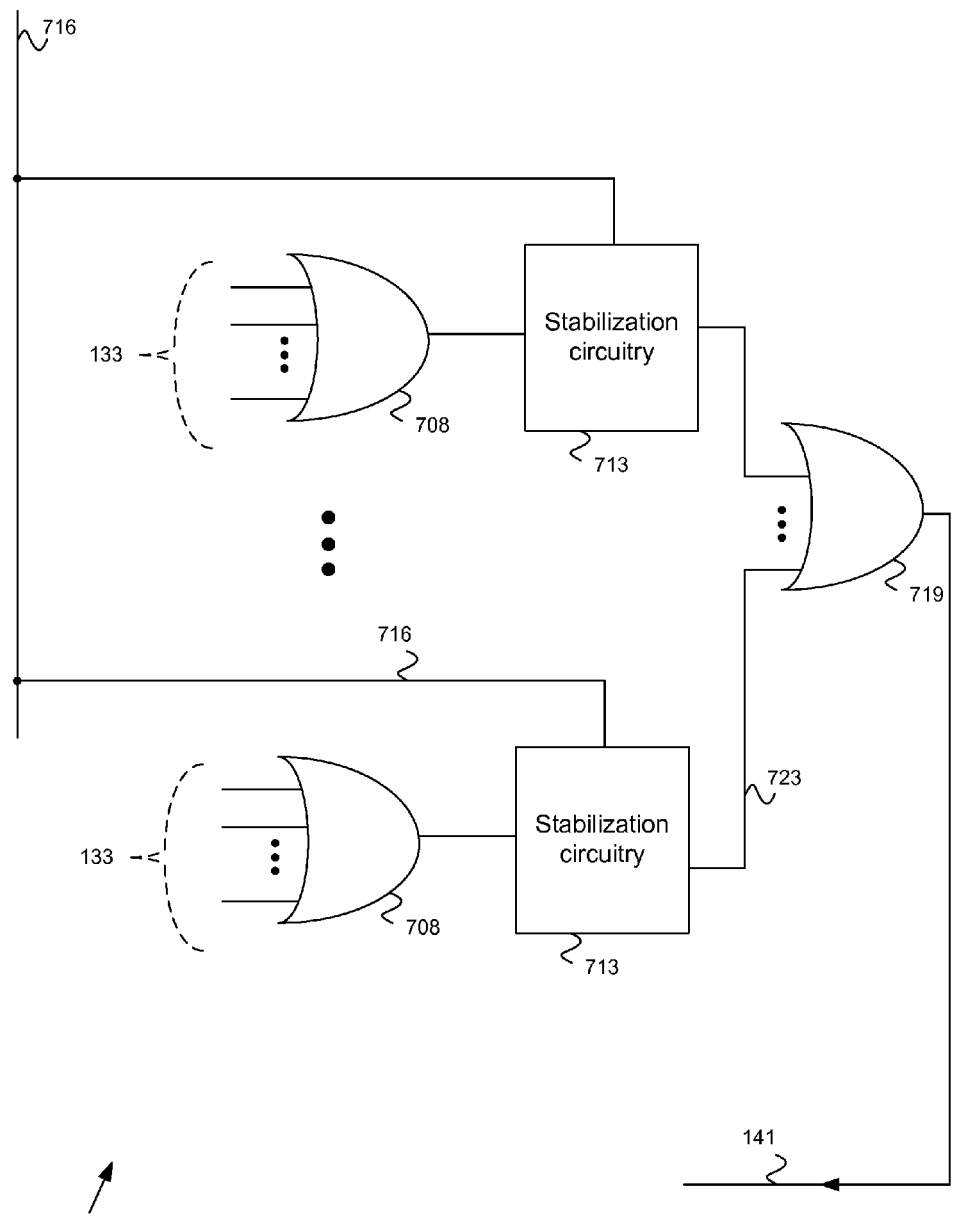
FIG. 7 is a diagram of an example of warning circuitry implemented in the processing circuitry of FIG. 1, in accordance with various embodiments.

Referring next to FIG. 7, shown is an example of warning circuitry 137 implemented in the processing circuitry 100 of FIG. 1, in accordance with various embodiments. The warning circuitry 137 comprises a blank logic gate 708 that receives one or more warning signals 133 from corresponding registers 123 (FIG. 1). Registers 123 may be a part of a register bank. To this end, the bank logic gate 708 detects if any of the registers 123 of a given bank are producing a warning expressed in a warning signal 133. The bank logic gate 708 may comprise one or more logic gates such as, for example, an OR gate.

The output of the bank logic gate 708 indicates whether there is a warning from any of the registers 123 of the corresponding bank. The output of the bank logic gate 708 passes through stabilization circuitry 713. The stabilization circuitry 713 may comprise one or more digital circuits such as, for example, a latch. The stabilization circuitry 713 is configured to stabilize a warning signal 133 by removing glitches or fluctuations in the warning signal 133. The stabilization circuitry 713 receives a stabilization clock signal 716 for stabilizing the output of the bank logic gate 708.

In the case where the warning signal 133 is produced by a register 123 using the clock delay implementation of FIG. 3, the stabilization clock signal 716 may be the combined clock signal 329 (FIG. 3). The combined clock signal 329 represents a signal in which both the global clock signal 306 (FIG. 3) and the delayed global clock signal 107 of FIG. 3 are active. In the case where the warning signal 133 is produced by a register 123 using the data delay implementation of FIG. 5, the stabilization clock signal 716 is the clock signal 107 (FIG. 5).

In various embodiments, there may be multiple banks of registers 123 in a voltage/frequency domain. Each register bank may produce a bank warning signal 723 that is stabilized by stabilization circuitry 713. Each bank warning signal 723 may be transmitted to a domain logic gate 719 for determining if any register 123 among the various banks have produced a stable warning signal 133. The domain logic gate 719 may comprise one or more logic gates such as, for example, an OR gate. The output of the domain logic gate is a domain warning signal 141. The domain warning signal 141 is used for indicating to a DVFC (FIG. 1) to adjust the voltage and/or frequency.

Figure 8:
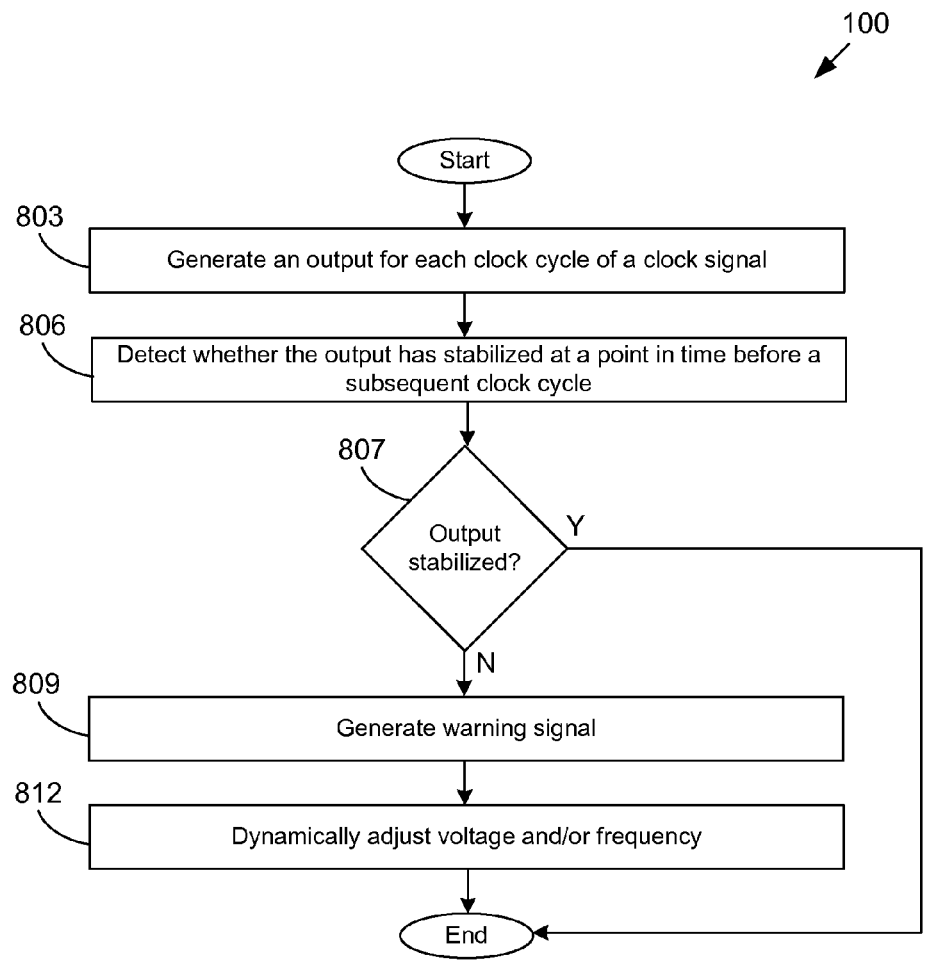
FIG. 8 is a flowchart illustrating examples of functionality implemented as portions of logic in the processing circuitry of FIG. 1 according to various embodiments of the present disclosure.

Referring next to FIG. 8, is a flowchart illustrating examples of functionality implemented as portions of logic in the processing circuitry 100 of FIG. 1 according to various embodiments of the present disclosure. It is understood that the flowchart of FIG. 8 provides merely an example of the many different types of functional arrangements that may be employed to implement the operation of the processing circuitry 100 as described herein. As an alternative, the flowchart of FIG. 8 may be viewed as depicting an example of steps of a method implemented in the processing circuitry 100 according to one or more embodiments.

To begin, at reference number 803, the processing circuitry 100 generates an output 118 (FIG. 1) for each clock cycle of a clock signal 107 (FIG. 1). An output 118 is generated by a logic block 115 (FIG. 1) each clock cycle. At reference number 806, the processing circuitry 100 detects whether the output 118 has stabilized at a point in time sufficiently far before a subsequent clock cycle. For example, the processing circuitry 100 may comprise a register 123 (FIG. 1), where the register 123 effectively samples the output 118 before the end of a clock cycle. The register 123 may sample the output 118 a few gate delays before the end of the current clock cycle. In various embodiments, the register 123 comprises a detection element 311 (FIGS. 3 and 5) for effectively sampling the output 118 early.

The register 123 may also comprise a service element 313 (FIGS. 3 and 5) for writing the output 118 for the current clock cycle. The output of the detection element 311 may be compared to the written output 126 (FIG. 1). If the output of the detection element mismatches the written output 126, then it is deemed that the logic block output 118 has not stabilized early enough, as seen at reference number 807.

In various embodiments of the present disclosure, the register 123 uses a clock delay implementation of FIG. 3. In other embodiments, the register 123 uses a data delay implementation of FIG. 5. In either case, a delay line 309 (FIG. 3), 513 (FIG. 5), may be used to create a delay. The use of the delay effectively creates a detection window for detecting whether the output 118 stabilizes sufficiently far before the end of a clock cycle.

If the output stabilizes early enough, the flowchart of FIG. 8 completes. Thus, it is determined that the operating conditions are sufficient or otherwise that there is sufficient headroom. If the output does not stabilizes early enough, then the processing circuitry 100 generates a warning signal 133 (FIG. 1), as seen at reference number 809. For example, the register 123 may generate the warning signal 133 in response to a mismatch between the sampled output and the written output 126.

In reference number 812, the processing circuitry 100 dynamically adjusts a voltage and/or frequency. The supply voltage and/or clock period of the clock signal 107 may be increased in response to a warning signal 133. By adjusting the voltage and/or frequency, the processing circuitry 100 provides more headroom for generating outputs 118 within a particular clock cycle.

The register 123 uses a delay that may be created by a delay line 309, 513. The delay line 309, such as the delay line 309 of FIG. 3 may be shared to serve a bank of registers 123. The delay line 309, 513 may be implemented using a series of inverters, current starved inverters, other digital logic circuits, or any other active circuit element. The delay line 309, 513 may also be implemented using the flight time down a long wire, one or more clocked elements, or a delay-locked loop or phase lock loop. In various embodiments, the delay line 309, 513 is variable. Through the use of a variable delay line 309, 513, global and local process variations that affect a clock signal 107 may be taken into account. If the dynamics of the system are not fully understood before fabrication, the variable delay line can be tuned based on tests of the actual integrated circuit such that the delay is long enough by not unnecessarily long. The delay introduced by the delay line 309, 513 may be expressed in terms of a number of gate delays. For example, if the processing circuitry 100 uses clock signal 107 that is characterized by a clock cycle with a length of twenty gate delays, then the delay introduced by the delay line 309, 513 may be set to equal a percentage of the length of the clock cycle. For example, the percentage may be 5-30% of the clock cycle. Alternatively, the introduced delay may be set to a particular number of gate delays. For example, the number may be one to six gate delays.

The flowchart of FIG. 8 shows the functionality and operation of an implementation of another portion of processing circuitry 100. If embodied in software, each item may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as the processing circuitry 100. The machine code may be converted from the source code, etc. If embodied in hardware, each item may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the items shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code, for example, the processing circuitry 100 (FIG. 1), can be embodied in any non-transitory computer-readable medium for use by or in connection with an instruction execution system such as, for example, a processing circuitry 100 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A system comprising:
 a logic block configured to generate an output on a per clock cycle basis;
 a register connected to the output of the logic block and configured to receive the output from the logic block and to generate a written output, the register comprising
 a detection circuit configured to sample the output directly from the logic block according to a global clock to generate a sampled output, and
 a service circuit to sample the output directly from the logic block according to a delayed global clock to generate the written output; and
 a comparator circuit including a single logic gate configured to receive the written output and the sampled output and configured to generate a warning signal when the written output does not match the sampled output,
 wherein the detection circuit comprises a latch, and the latch is transparent during an inactive portion of the global clock, and
 wherein the service circuit comprises a flip-flop.

2. The system of claim 1, further comprising a delay line for generating the delayed global clock based at least upon the global clock.

3. The system of claim 2, further comprising stabilization circuitry configured to stabilize the warning signal based at least upon on combining the global clock and the delayed global clock.

4. The system of claim 3, wherein combining comprises generating a stabilization clock signal by performing an AND operation on the global clock and the delayed global clock.

5. The system of claim 1, wherein the single logic gate comprises an XOR gate.

6. The system of claim 1, further comprising:
 a dynamic voltage frequency controller configured to adjust at least one of a frequency of the global clock or a power supply voltage based on the warning signal.

7. The system of claim 1, wherein the detection circuit includes an inverter to synchronize sampling of the output to a compliment of the global clock.

8. A method comprising:
 generating an output from a logic block on a per clock cycle basis;
 receiving the output of the logic block at a register;
 sampling, by a detection circuit of the register, the output directly from the logic block according to a global clock to generate a sampled output;
 sampling, by a service circuit of the register, the output directly from the logic block according to a delayed global clock to generate a written output;
 comparing, in a comparator that includes a single logic gate, the written output and the sampled output; and generating, by the comparator, a warning signal when the written output does not match the sampled output, wherein the detection circuit of the register comprises a latch, and the latch is transparent during an inactive portion of the global clock, and wherein the service circuit of the register comprises a flip-flop.

9. The method of claim 8, further comprising delaying, with a delay line, the global clock to generate the delayed global clock.

10. The method of claim 9, further comprising stabilizing the warning signal, with a stabilization circuit, based at least upon a combination of the global clock and the delayed global clock.

11. The method of claim 10, further comprising generating the combination of the global clock and the delayed global clock through an AND operation.

12. The method according to claim 8, wherein the single logic gate is an XOR gate, and the comparing is performed by performing an XOR operation on the written output and the sampled output.

* * * * *